United States Patent [19]

Cartier

[11] Patent Number: 5,590,735
[45] Date of Patent: Jan. 7, 1997

[54] FORKLIFT TRUCK

[75] Inventor: Guy Cartier, Loudun, France

[73] Assignee: Linde Aktiengesellschaft, Germany

[21] Appl. No.: 35,652

[22] Filed: Mar. 23, 1993

[30] Foreign Application Priority Data

Mar. 26, 1992 [DE] Germany ................ 42 09 862.9

[51] Int. Cl.⁶ ............................................ B62D 63/00
[52] U.S. Cl. ........................... 180/210; 16/19; 16/44;
280/43.22; 280/43.12; 414/495; 414/608;
187/222; 254/2 R
[58] Field of Search ............................ 16/19, 45, 46,
16/47, 48, 35 R, 35 D, 38, 44, 43; 187/222;
414/495, 498, 608, 474, 476; 280/43.12,
47.12, 47.27, 47.28, 63, 64, 43.17; 180/210;
254/2 R, 2 C

[56] References Cited

U.S. PATENT DOCUMENTS

| | | | |
|---|---|---|---|
| 1,161,007 | 11/1915 | Overmyer | 280/43.22 X |
| 1,247,827 | 11/1917 | Hansen | 16/19 |
| 1,482,953 | 2/1924 | Tideman | 280/43.22 X |
| 2,172,973 | 9/1939 | Hays et al. | 16/19 X |
| 2,793,875 | 5/1957 | Quayle | 16/44 X |
| 3,372,769 | 3/1968 | Jung et al. | 280/43.12 |
| 4,166,516 | 9/1979 | Thurmond, Jr. | 16/19 X |
| 4,575,896 | 3/1986 | Nakao et al. | 16/44 X |
| 4,750,579 | 6/1988 | Jarl et al. | 280/43.12 X |

FOREIGN PATENT DOCUMENTS

| | | | |
|---|---|---|---|
| 13720 | 4/1985 | Japan | 16/19 |
| 116353 | 3/1969 | Norway | 280/43.12 |
| 357523 | 11/1961 | Switzerland | 16/44 |
| 846586 | 8/1960 | United Kingdom | 16/45 |
| 936538 | 9/1963 | United Kingdom | 16/19 |
| 296326 | 12/1988 | WIPO | 16/19 |

*Primary Examiner*—Frank E. Werner
*Attorney, Agent, or Firm*—Webb Ziesenheim Bruening Logsdon Orkin & Hanson, P.C.

[57] ABSTRACT

A forklift truck having a drive wheel and a plurality of support wheels and a mounting arrangement for independently adjusting the vertical position of each support wheel. The mounting arrangement includes a cylindrical pivot sleeve attached to the forklift truck and a cylindrical pivot member coaxial with the cylindrical pivot sleeve and longitudinally and rotatably adjustable in the cylindrical pivot sleeve. A support wheel is pivotally mounted on the lower end of the cylindrical pivot member and a pin is provided adjacent to the lower end of the cylindrical pivot member for locking the cylindrical pivot member in one of at least two vertical positions in the cylindrical pivot sleeve.

20 Claims, 4 Drawing Sheets

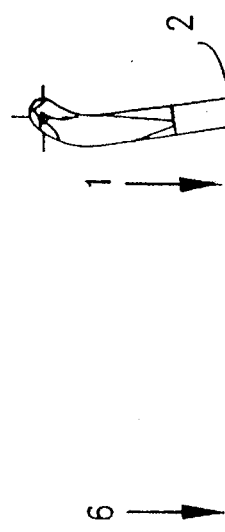
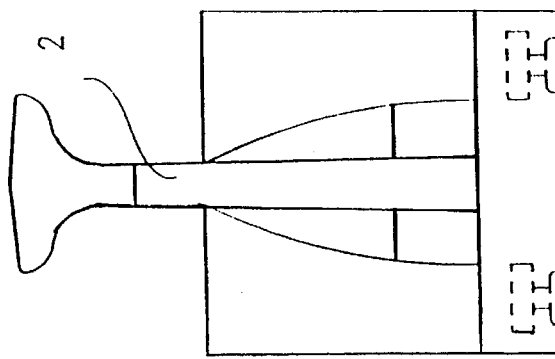
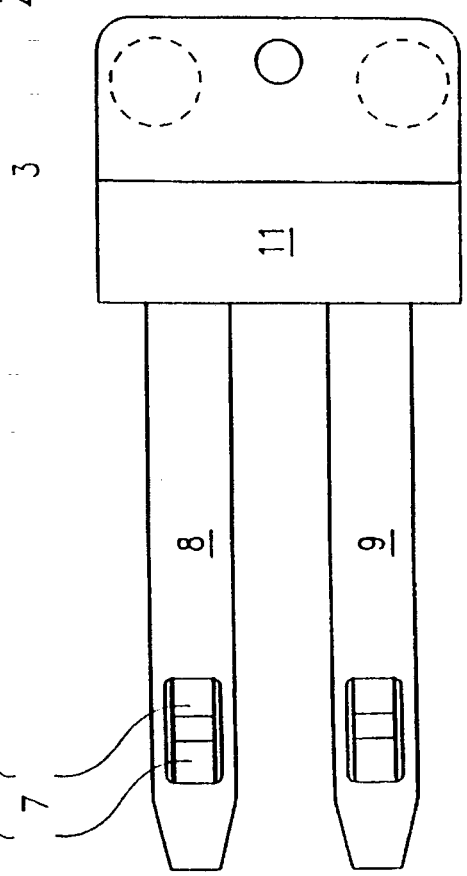
Fig. 1a
Fig. 1b
Fig. 1c

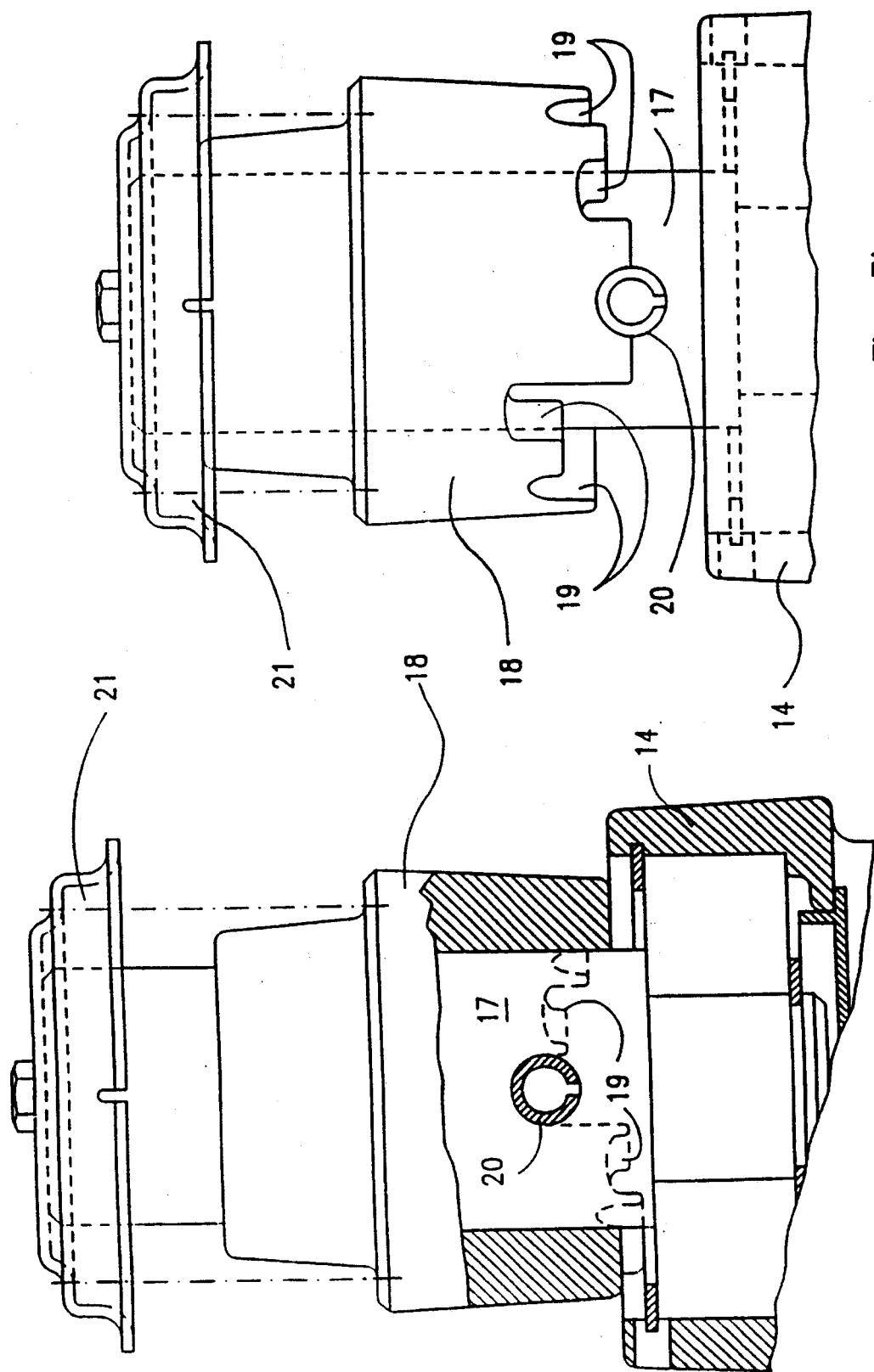

FORKLIFT TRUCK

BACKGROUND OF THE INVENTION

1. Field of the Invention

This invention relates generally to a forklift truck having a drive wheel and a pair of laterally spaced support wheels and more particularly to an independently adjustable mounting arrangement for each support wheel.

2. Description of the Prior Art

Hand-guided forklift trucks are available in walking and seated models for moving and stacking items. To improve the stability of a forklift truck, support wheels are provided at a distance from the drive wheel. These wheels are generally spring mounted or suspended with predetermined clearance above the road surface. The support wheels increase the stability of the forklift truck if the truck tends to tilt because of load distribution which will increase the force on the mounting spring when the support wheels contact the road surface. The support wheels improve the stability of a forklift truck, especially when transporting a load with a high center of gravity. Because of varying operating conditions created by different road surfaces and different loads, none of the prior art support wheel arrangements is completely satisfactory.

SUMMARY OF THE INVENTION

The object of the invention is to provide a forklift truck which is suitable for use under varying operating conditions. This object is achieved by providing an adjustment arrangement for the vertical position of each support wheel so that the forklift truck can be easily adapted to different operating conditions.

In one embodiment of the invention, each support wheel is rotatably mounted on the lower end of a cylindrical pivot member located in a coaxial cylindrical pivot sleeve which is connected to the drive section of a forklift truck so that the wheel can be moved vertically relative to the road surface and locked in at least two different vertical positions. The cylindrical pivot sleeve has several recesses of different vertical depths located around its lower edge which are adapted to be engaged by a pin connected to the cylindrical pivot member. Matching pairs of recesses of equal depths are provided on diametrically opposed portions of the edge of the cylindrical pivot sleeve so that the line connecting two recesses intersects the center axis of the cylindrical pivot sleeve. The cylindrical pivot member has a radial hole extending through a hole located at its lower end and a pin is located in the hole with an end projecting out of each end. The ends of the pin are adapted to be located in a matching pair of opposed recesses to vertically position the cylindrical pivot member in the cylindrical pivot sleeve.

It is advantageous if the cylindrical pivot member is spring-loaded in the upward direction. To accomplish the upward spring loading, a plate is attached to the upper end of the cylindrical pivot member. The plate projects radially beyond the upper end of the cylindrical pivot sleeve and a pressure spring is located between the lower surface of the plate and an annular shoulder formed on the exterior surface of the cylindrical pivot sleeve. The vertical position of each support wheel can be easily adjusted by pushing the cylindrical pivot member downwardly against the force of the spring and rotating the cylindrical pivot member until the pair of matching opposed recesses having the desired depth is located on the lower edge of the cylindrical pivot sleeve. The pressure is then released from the plate on the upper end of the cylindrical pivot member which causes the spring to move the cylindrical pivot member upwardly relative to the cylindrical pivot sleeve so that the ends of the pin lock in the opposed recesses of a matched pair of recesses.

The prestressed spring in the support wheel mounting applies an elastic load on the support wheel in the direction of the road surface. According to the invention the height of the wheel can be adjusted to vary the prestress applied to each support wheel in relation to the road surface. The use of the invention is particularly appropriate where a pivoted lever arm is located in the support wheel mounting which can be pivoted about a horizontal axis. The support wheel is fastened to the distal end of the lever arm. A rubber or elastic plastic thrust bearing is located between a second lever arm and the mounting which applies pressure to the second lever arm.

A complete understanding of the invention will be obtained from the following description when taken in connection with the accompanying drawings wherein like reference characters identify like parts throughout.

BRIEF DESCRIPTION OF THE DRAWINGS

FIG. 1a is a front elevation of a forklift truck according to the invention;

FIG. 1b is a side elevation of the forklift truck shown in FIG. 1a;

FIG. 1c is a plan view of the forklift truck shown in FIG. 1a;

FIG. 2b is a front view of the support wheel mounting shown in FIG. 2a;

FIG. 3a is a partial section of the upper end of the support wheel mounting shown in FIG. 2a; and FIG. 3b is a side view of the support wheel mounting shown in FIG. 2a with the wheel at a different height.

DESCRIPTION OF THE PREFERRED EMBODIMENT

Figure 2A:
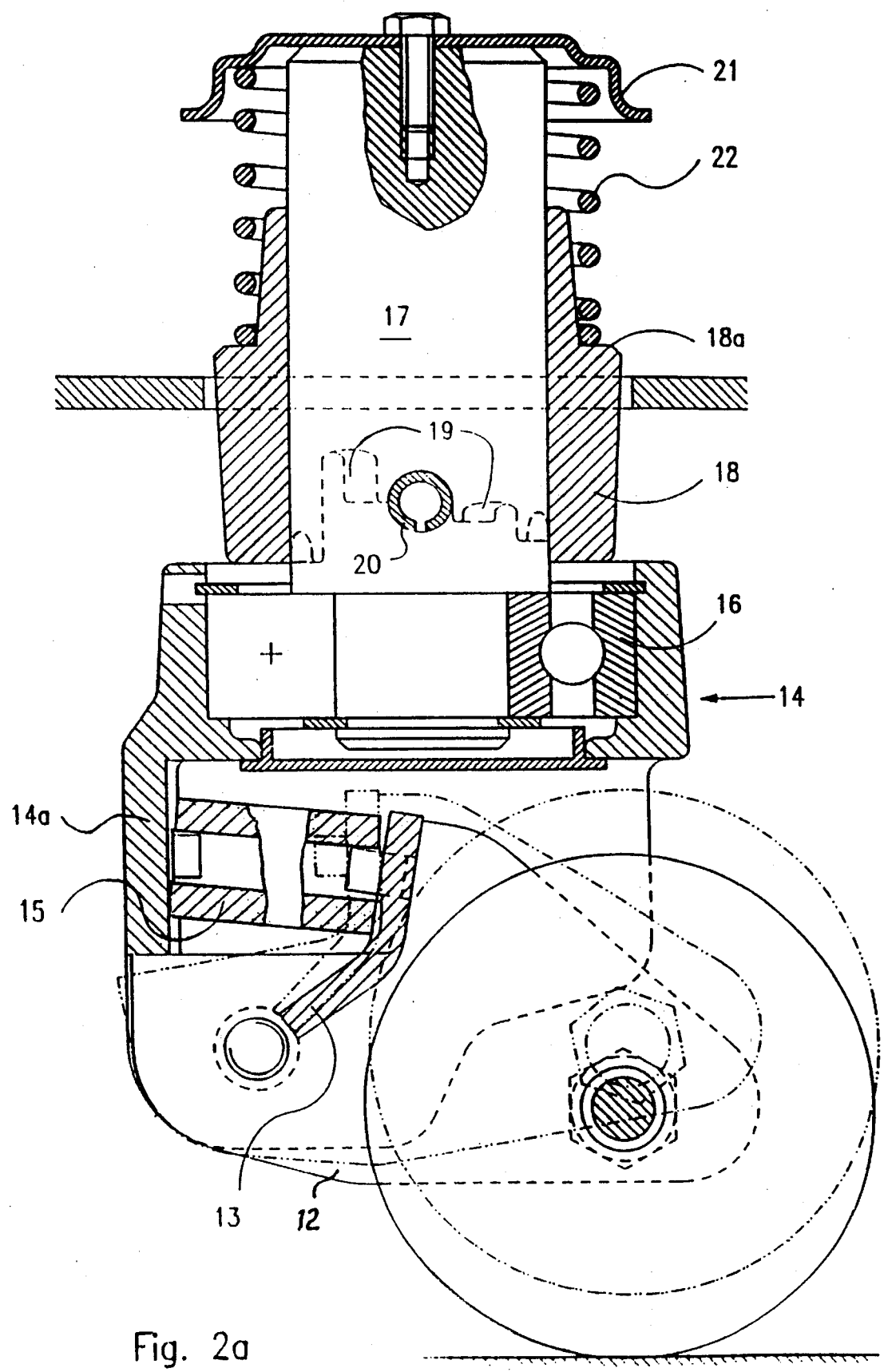
FIG. 2a is a longitudinal section through a support wheel mounting.

The forklift truck illustrated in FIGS. 1a–1c of the drawings has a drive section 1 with a steering handle 2, a drive wheel 3 and two laterally spaced support wheels 4 and 5 which are spaced from drive wheel 3. A vertically movable load section 6 is connected by a linkage (not shown) to drive section 1 and includes spaced horizontal load arms 8 and 9 with wheels 7. A battery compartment 11 is located on load section 6.

Figure 2B:
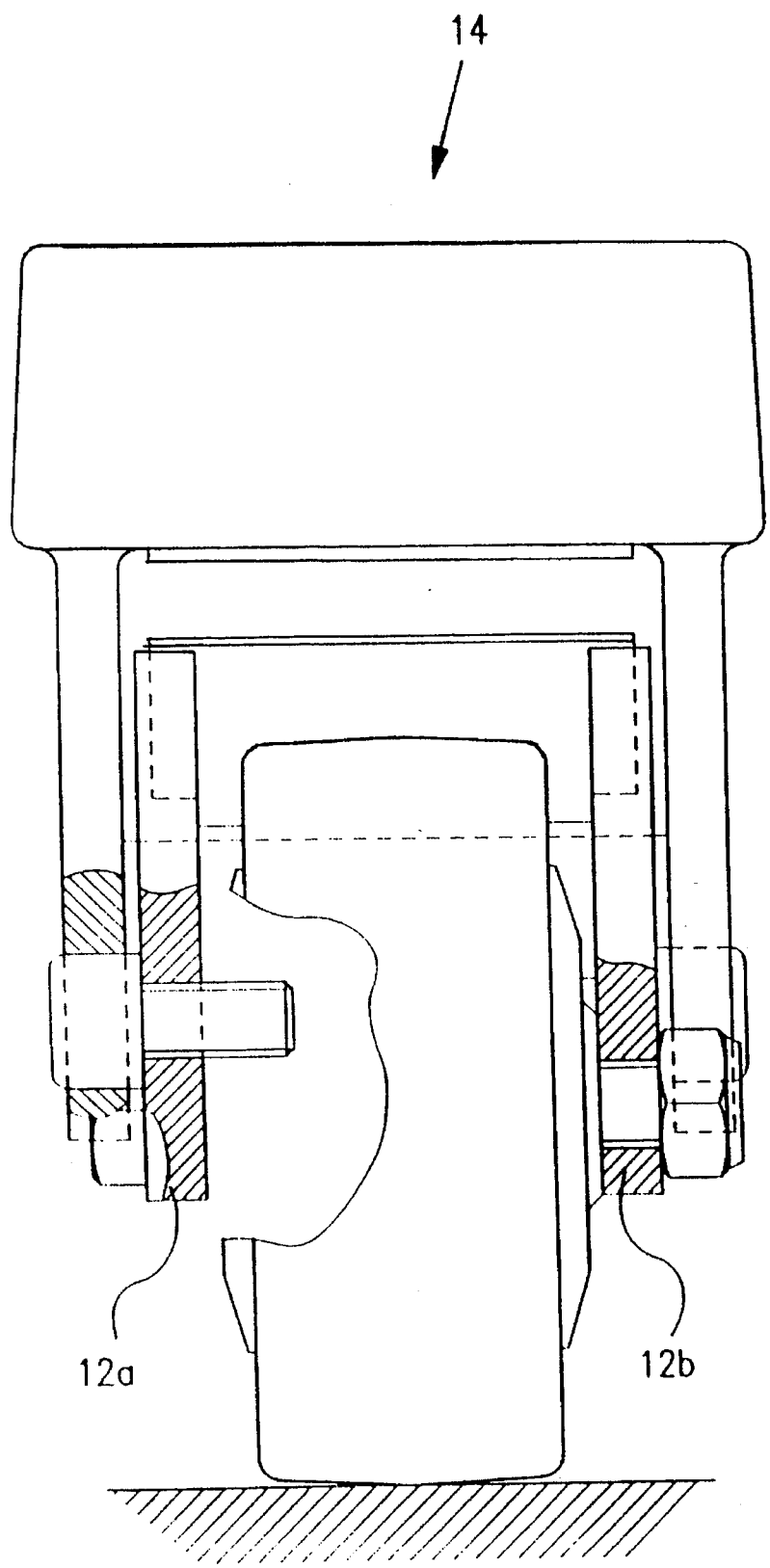

FIGS. 2a and 2b of the drawings show a mounting arrangement for each support wheel 4 and 5. Each support wheel is rotatably mounted on an articulated lever arm 12 having spaced members 12a and 12b. A resilient thrust element 15 made of a rubber or of an elastic plastic material is located between a second lever arm 13 attached to articulated lever arm 12 and a depending portion 14a of wheel mounting member 14. Each support wheel 4 and 5 is spring-mounted so that it is forced toward the road surface under a predetermined pressure. The wheel mounting member 14 has an annular bearing 16 located therein which provides a rotating connection for a cylindrical pivot member 17. The pivot member is located in a cylindrical pivot sleeve 18 which is rigidly connected to the forklift truck.

Several spaced recesses 19 having different depths are formed around the circumference of the lower edge of cylindrical pivot sleeve 18. Matched recesses of equal depths are located diametrically opposite to each other so that a line connecting the center of two opposed recesses intersects the center axis of cylindrical pivot member 17. Cylindrical pivot member 17 has a radial hole in the lower end and a pin 20 projects out of each end of the hole. The ends of pin 20 are adapted to be positioned in a pair of matching opposed recesses 19. The vertical force on the support wheel therefore acts on spaced opposed recesses 19 of cylindrical pivot sleeve 18 and thus on drive section 1 of the forklift by wheel mounting member 14, bearing 16, cylindrical pivot member 17 and the ends of pin 20 which are located in the recesses.

Independently of the height of the wheel, cylindrical pivot member 17 is long enough to always project upwardly out of the upper end of cylindrical pivot sleeve 18. A horizontal plate 21 is fixed on the upper end of cylindrical pivot member 17 and a pressure spring 22 is located between the lower surface of plate 21 and an annular shoulder 18a formed on the outer surface of cylindrical pivot sleeve 18. Thus, cylindrical pivot member 17 is spring-loaded in the upward vertical direction so that it is prevented from sliding downwardly out of cylindrical pivot sleeve 18 if a support wheel 4 or 5 loses contact with the road surface. During normal operation, the ends of pin 20 are located in a pair of opposed recesses 19 having the same depth. To adjust the height of a support wheel 4 or 5, cylindrical pivot member 17 is moved downwardly by pressure on the upper surface of horizontal plate 21 until the ends of pin 20 disengage from the pair of opposed recesses 19 in which the pin ends were previously engaged. Cylindrical pivot member 17 is rotated around its central axis until a pair of opposed recesses 19 having a depth which corresponds to the desired height setting of the support wheel 4 or 5 or the desired spring prestress is reached.

FIG. 3a of the drawings shows a height setting in which the minimum spring prestress, i.e., the maximum distance of the support wheel from the road surface, has been set. Such a setting is selected for an uneven road surface and for loads with a low center of gravity.

FIG. 3b of the drawings shows a height setting in which the maximum spring prestress, i.e., the minimum distance of the support wheel from the road surface, has been set. Such a setting is used for a flat road surface and for loads with a high center of gravity to achieve the maximum stability of the forklift truck.

While a specific embodiment of the invention has been described in detail herein, it will be appreciated by those skilled in the art that various modifications and alternatives to the embodiment could be developed in light of the overall teachings of the disclosure. Accordingly, the particular arrangement is illustrative only and is not limiting as to the scope of the invention which is to be given the full breadth of the appended claims and any and all equivalents thereof.

I claim:

1. A forklift truck having a drive wheel and a plurality of horizontally spaced and vertically adjustable support wheels, spring loaded means for independently vertically positioning each of said plurality of support wheels.

2. A forklift truck as set forth in claim 1 wherein said spring loaded means for independently vertically positioning each of said plurality of support wheels includes a wheel mounting member, a cylindrical pivot sleeve attached to said forklift truck, a cylindrical pivot member coaxial with said cylindrical pivot sleeve and longitudinally and rotatably adjustable in said cylindrical pivot sleeve and means for locking said cylindrical pivot member in said cylindrical pivot sleeve in one of at least two different positions.

3. A forklift truck as set forth in claim 2 including a resilient thrust means in said wheel mounting member for independently forcing each said support wheel in a direction away from said cylindrical pivot sleeve.

4. A forklift truck as set forth in claim 3 wherein said wheel mounting member includes a dependent portion and an articulated lever arm, means mounting said articulated lever arm for pivotal movement on a horizontal axis, said articulated lever arm having spaced members and means for mounting said support wheel on said spaced members, and a second lever arm connected to said articulated lever arm wherein said resilient thrust means is located between said dependent portion of said wheel mounting member and said second lever arm.

5. A forklift truck as set forth in claim 4 wherein said thrust means is a rubber.

6. A forklift truck as set forth in claim 4 wherein said thrust means is an elastic plastic material.

7. A forklift truck as set forth in claim 2 wherein each of said cylindrical pivot sleeve and said cylindrical pivot member has a lower edge and including a plurality of pairs of matched opposed recesses having different depths formed on said lower edge of said cylindrical pivot sleeve and diametrically opposed projections on said lower end of said cylindrical pivot member for engagement with a pair of said matched opposed recesses of equal depth on said cylindrical pivot sleeve.

8. A forklift truck as set forth in claim 7 including a resilient thrust means in said wheel mounting member for independently forcing each said support wheel in a direction away from said cylindrical pivot sleeve.

9. A forklift truck as set forth in claim 7 including a spring located between said cylindrical pivot member and said cylindrical pivot sleeve to urge said cylindrical pivot member upwardly relative to said cylindrical pivot sleeve.

10. A forklift truck as set forth in claim 9 wherein each of said cylindrical pivot member and cylindrical sleeve has an upper end, said upper end of said cylindrical pivot member projects above the upper end of said cylindrical pivot sleeve at all times, and a plate attached to said upper end of said cylindrical pivot member, said plate having a lower surface, an annular exterior shoulder formed on said cylindrical pivot sleeve intermediate said upper end and said lower edge of said cylindrical pivot sleeve, and said spring being located between said lower surface of said plate and said annular exterior shoulder formed on said cylindrical pivot sleeve.

11. A forklift truck as set forth in claim 10 including a resilient thrust means in said wheel mounting member for independently forcing each said support wheel in a direction away from said cylindrical pivot sleeve.

12. A forklift truck as set forth in claim 9 including a resilient thrust means in said wheel mounting member for independently forcing each said support wheel in a direction away from said cylindrical pivot sleeve.

13. A forklift truck as set forth in claim 7 wherein said cylindrical pivot member has a vertical axis and each pair of matched opposed recesses of equal depth are radially aligned and are radially aligned with said vertical axis of said cylindrical pivot member so that a line connecting each pair of matched opposed recesses of equal depth intersects said vertical axis of said cylindrical pivot member, a radial hole extending through said cylindrical pivot member adjacent said lower edge of said cylindrical pivot member and a pin located in said radial hole having opposed ends extending out of said cylindrical pivot member to form said projections, whereby said opposed ends of said pin are adapted to be located in a pair of matched opposed recesses of equal depth in said cylindrical pivot sleeve.

14. A forklift truck as set forth in claim 13 including a resilient thrust means in said wheel mounting member for independently forcing each said support wheel in a direction away from said cylindrical pivot sleeve.

15. A forklift truck as set forth in claim 13 including a spring located between said cylindrical pivot member and said cylindrical pivot sleeve to urge said cylindrical pivot member upwardly relative to said cylindrical pivot sleeve.

16. A forklift truck as set forth in claim 15 wherein each of said cylindrical pivot member and cylindrical sleeve has an upper end, the upper end of said cylindrical pivot member projects above the upper end of said cylindrical pivot sleeve at all times, and a plate attached to said upper end of said cylindrical pivot member, said plate having a lower surface, an annular exterior shoulder formed on said cylindrical pivot sleeve intermediate said upper end and said lower edge of said cylindrical pivot sleeve, and said spring being located between said lower surface of said plate and said annular exterior shoulder formed on said cylindrical pivot sleeve.

17. A forklift truck as set forth in claim 16 including a resilient thrust means in said wheel mounting member for independently forcing each said support wheel in a direction away from said cylindrical pivot sleeve.

18. A forklift truck as set forth in claim 15 including a resilient thrust means in said wheel mounting member for independently forcing each said support wheel in a direction away from said cylindrical pivot sleeve.

19. In a forklift truck including a drive section having a central drive wheel and a plurality of horizontally spaced and vertically adjustable support wheels and a steering handle and a load section having spaced load support arms and at least one wheel on each load support arm, the improvement comprising a wheel mounting member for each of said horizontally spaced and vertically adjustable support wheels, said wheel mounting member including a cylindrical pivot sleeve connected to said drive section, a cylindrical pivot member having an end located within and moveable relative to said cylindrical pivot sleeve and a support means for a wheel on the distal end and spring loaded means located between said cylindrical pivot sleeve and said cylindrical pivot member for independently urging each of said support wheels upwardly.

20. A forklift truck as set forth in claim 19 wherein each of said cylindrical pivot sleeve and said cylindrical pivot member has a lower edge and including a plurality of pairs of matched opposed recesses having different depths formed on said lower edge of said cylindrical pivot sleeve and diametrically opposed projections on said lower end of said cylindrical pivot member for engagement with a pair of said matched opposed recesses of equal depth on said cylindrical pivot sleeve.

* * * * *